US006866129B2

(12) United States Patent
Tomiyama (10) Patent No.: US 6,866,129 B2
(45) Date of Patent: Mar. 15, 2005

(54) LOCKUP DEVICE FOR FLUID-TYPE TORQUE TRANSMISSION DEVICE

(75) Inventor: Naoki Tomiyama, Hirakata (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 10/375,200

(22) Filed: Feb. 28, 2003

(65) Prior Publication Data

US 2003/0173177 A1 Sep. 18, 2003

(30) Foreign Application Priority Data

Mar. 15, 2002 (JP) ........................................ 2002-073007

(51) Int. Cl.[7] .............................................. F16H 45/02
(52) U.S. Cl. ..................................... 192/3.29; 192/212
(58) Field of Search ................................ 192/3.29, 212

(56) References Cited

U.S. PATENT DOCUMENTS

| 5,918,713 | A | * | 7/1999 | Shimizu et al. | ............ | 192/3.29 |
| 6,016,894 | A | * | 1/2000 | Kundermann | ............... | 192/3.3 |
| 6,155,392 | A | * | 12/2000 | Kundermann | ............... | 192/3.3 |
| 6,264,018 | B1 | * | 7/2001 | Matsuoka et al. | ......... | 192/3.29 |
| 6,325,191 | B1 | * | 12/2001 | Meisner et al. | ............ | 192/3.29 |
| 6,736,247 | B2 | * | 5/2004 | Arhab et al. | ............... | 192/3.29 |
| 2001/0007383 | A1 | * | 7/2001 | Schmid | ...................... | 192/3.29 |
| 2002/0056600 | A1 | * | 5/2002 | Fukunaga et al. | ......... | 192/3.29 |

FOREIGN PATENT DOCUMENTS

| JP | 3-144153 A | * | 6/1991 |
| WO | WO 01/81792 A1 | * | 11/2001 |

* cited by examiner

Primary Examiner—Rodney H. Bonck
(74) Attorney, Agent, or Firm—Shinjyu Global IP Counselors, LLP (57) ABSTRACT

A lockup device 7 having a dual friction surface to make it possible to arrange a friction coupling part on the outside with respect to the radial direction is provided. The lockup device 7 has a clutch plate 71, a drive plate 72, a driven plate 73, a plurality of torsion springs 74, a spring holder 80, a piston 75, and a piston coupling mechanism 76. The piston 75 radially extends to the position of a friction coupling part 71c of the clutch plate 71. The mounting radius of the torsion springs 74 is shorter than a radius extending to the radial position of the outer circumferential edge of the piston 75 or the friction coupling part 71c. The protrusions 72d of the drive plate 72 mate with the recessions 71e of the clutch plate 71 at a radial position that is farther from the rotational axis than mounting radius of the torsion springs 74.

12 Claims, 4 Drawing Sheets

LOCKUP DEVICE FOR FLUID-TYPE TORQUE TRANSMISSION DEVICE

BACKGROUND OF THE INVENTION

1. Field of the Invention

The present invention relates to a lockup device for a fluid-type torque transmission device. More specifically, the present invention relates to a lockup device provided in a fluid-type torque transmission device equipped with a front cover having a friction surface, an impeller that is fixed to the front cover and forms a fluid chamber, and a turbine arranged opposite the impeller inside the fluid chamber.

2. Background Information

A conventional torque converter has three types of bladed wheels (an impeller, a turbine, and a stator) arranged therein. A torque converter represents one type of fluid-type torque transmission device because it transmits torque through fluid enclosed therein. A torque converter is often provided with a lockup device. The lockup device is usually disposed in the space between the turbine and a front cover, which form a fluid chamber of the torque converter. The lockup device is a mechanism that serves to couple mechanically the front cover and the turbine together such that torque can be transmitted directly from the front cover to the turbine. Normally, the lockup device has a circular disc shaped piston, a drive plate, a driven plate, and a torsion spring. The piston can be pressed against the front cover. The drive plate is fixed to an outer circumferential part of the piston. The driven plate is fixed to the turbine. The torsion spring serves to couple elastically the drive plate and the driven plate together in the rotational direction.

When the lockup device is engaged, torque is transmitted from the front cover to the piston and from the piston to the turbine through the torsion spring. The torsion spring is compressed in the rotational direction between the drive plate and the driven plate and acts to absorb and damp torsional vibrations.

There have already been proposals for such a lockup device that has a plurality of friction surfaces to increase the torque transmission capacity. One such device has a drive plate, a driven plate, a plurality of torsion springs, and a piston. The drive plate is provided with a friction coupling part. The driven plate is joined together with the turbine. The plurality of torsion springs elastically couple the drive plate and driven plate together in the rotational direction. The piston presses the friction coupling part against the front cover. Here, the driven plate holds the outside circumference and rotationally facing ends of the torsion springs. The drive plate has an abutting part for abutting against the rotationally facing end parts of the torsion springs so that it can compress the torsion springs in the rotational direction. The friction coupling part of the drive plate is disposed axially between the piston and the front cover.

In this lockup device, the drive plate is an annular plate having the friction coupling part and abutting part formed integrally thereon. The abutting part of the drive plate is arranged such that it can abut against the torsion springs in the vicinity of the mounting radius of the torsion springs. Meanwhile, the friction coupling part of the drive plate must be arranged at a position that is more inward in the radial direction than the position of the abutting part because the friction coupling part is sandwiched axially between the piston and the front cover. Consequently, the friction coupling part cannot be positioned on the radially outside portion of the drive plate. Thus, the torque transmission capacity of the lockup device cannot be increased.

When such a lockup device is in the engaged state, torque is transmitted from the front cover to the drive plate and from the drive plate to the turbine through the torsion springs. In this state, the torsion springs are compressed in the rotational direction of the torque converter between the drive plate and the driven plate and act to absorb and damp torsional vibrations. The torsion springs also move radially outward due to centrifugal force and slide against the driven plate, which holds the torsion springs. Consequently, wearing of the torsion springs and the driven plate becomes a problem.

In view of the above, it will be apparent to those skilled in the art from this disclosure that there exists a need for an improved lockup device for a fluid-type torque transmission device that overcomes the aforementioned problems. This invention addresses this need in the art as well as other needs, which will become apparent to those skilled in the art from this disclosure.

SUMMARY OF THE INVENTION

The object of the present invention is to make it possible to arrange the friction coupling part on the outside with respect to the radial direction in a lockup device having a dual friction surface. Another object of the present invention is to reduce sliding of the torsion springs against other members in a lockup device.

A lockup device for a fluid-type torque transmission device in accordance with a first aspect of a preferred embodiment of the present invention is equipped with a front cover, an impeller, and a turbine. The front cover has a friction surface. The impeller is fixed to the front cover and forms a fluid chamber therewith. The turbine is arranged opposite the impeller inside the fluid chamber. The lockup device is equipped with a clutch member, a piston, a plurality of elastic members, a drive member, and a driven member. The clutch member has a friction coupling part that can be pressed against the friction surface of the front cover. The piston is arranged between the front cover and the turbine and presses the friction coupling part against the friction surface. The elastic members are arranged in the rotational direction. The drive member has an abutting part and a mating member. The abutting part abuts against rotationally facing ends of the elastic members in such a manner that torque can be transmitted. The mating member is positioned farther outward in the radial direction than the abutting part and mates with the clutch member in such a manner that the drive member cannot rotate relative to the clutch member. The driven member is fixed to the turbine and receives torque from the plurality of elastic members.

In this lockup device, the clutch member has a friction coupling part. The drive member has an abutting part and a mating part. The abutting part abuts against the rotationally facing ends of the elastic members in such a manner that torque can be transmitted. The mating part is positioned farther outward in the radial direction than the abutting part and mates with the clutch member in such a manner that the drive member cannot rotate relative to the clutch member. As a result, the mating part of the drive member can be arranged on the outside with respect to the radial direction and the friction coupling part of the clutch member can be arranged on the outside with respect to the radial direction.

A lockup device for a fluid-type torque transmission device in accordance with a second aspect of the present invention is the transmission device of the first aspect, wherein, the clutch member is an annular plate and the outside radius of the clutch member is larger than a mounting radius of the elastic members.

With this lockup device the friction coupling part of the clutch member can be positioned even further to the outside because the outer circumferential portion of the clutch member is positioned further to the outside than a mounting radius of the elastic members.

A lockup device for a fluid-type torque transmission device in accordance with a third aspect of the present invention is the transmission device of the first or second aspects, wherein the drive member has an annular part, a plurality of mating parts and a plurality of abutting parts. The plurality of mating parts is formed on the outside edge of the annular part and extends radially outward. The plurality of abutting parts is formed on an inner circumferential section of the annular part and extends in the axial direction.

A lockup device for a fluid-type torque transmission device in accordance with a fourth aspect of the present invention is the transmission device of any one of the first to third aspects, wherein the drive member is positioned in the axial and radial directions by the driven member. With this lockup device, the axial and radial positioning of the drive member is stable because the drive member is positioned in the axial and radial directions by the driven member.

A lockup device for a fluid-type torque transmission device in accordance with a fifth aspect of the present invention is the transmission device of the fourth aspect, wherein the driven member has a first driven member and a second driven member. The first driven member is fixed to the turbine. The second driven member is fixed to the first driven member and serves to position the drive member in the axial and radial directions.

A lockup device for a fluid-type torque transmission device in accordance with a sixth aspect of the present invention is the transmission device of any one of the first to fifth aspects, wherein the driven member limits the rotation of the drive member to a prescribed angular range when the drive member rotates relative to the driven member. With this lockup device, any desired torsional characteristic can be obtained because the compression of the elastic members disposed between the drive member and the driven member can be limited to a prescribed angular range.

A lockup device for a fluid-type torque transmission device in accordance with a seventh aspect is equipped with a front cover having a friction surface, an impeller that is fixed to the front cover and forms a fluid chamber therewith, and a turbine arranged opposite the impeller inside the fluid chamber. The lockup device is equipped with a clutch member, a plurality of elastic members, a drive member, a driven member, an intermediate member, and a piston. The clutch member has a friction coupling part that can be pressed against the friction surface of the front cover. The elastic members are arranged in the rotational direction. The drive member mates with the clutch member such that it cannot rotate relative to the clutch member and can transmit torque to the plurality of elastic members. The driven member is fixed to the turbine and receives torque from the plurality of elastic members. The intermediate member supports at least the radially outward facing side of each of the elastic members and can rotate relative to the driven member and drive member. The piston is arranged between the front cover and the turbine and serves to press the friction coupling part against the friction surface.

With this lockup device, the elastic members are compressed in the rotational direction when the drive member and driven member rotate relative to each other. When this occurs, the elastic members do move radially outward, but it is difficult for the elastic members to slide against the drive member and driven member because each of the elastic members is supported by the intermediate member on at least its radially outward facing side and one axially facing side. Consequently, wear of the elastic members, drive member, and driven member can be reduced.

A lockup device for a fluid-type torque transmission device in accordance with a eighth aspect of the present invention is the transmission device of the seventh aspect, wherein the plurality of elastic members has a plurality of pairs of elastic members arranged such that the elastic members operate in series in the rotational direction. The intermediate member has a transmitting part arranged between each pair of elastic members. With this lockup device, torsional vibration absorbing performance can be achieved similar to that obtained with elastic members that are relatively long in the rotational direction because the plurality of elastic members acts in series.

A lockup device for a fluid-type torque transmission device in accordance with a ninth aspect of the present invention is the transmission device of the seventh or eighth aspects, wherein the intermediate member is positioned in the radial direction by the driven member. With this lockup device, the radial positioning of the intermediate member is stable because the intermediate member is positioned by the driven member in the radial direction.

A lockup device for a fluid-type torque transmission device in accordance with a tenth aspect of the present invention is the transmission device of any one of the seventh to ninth aspects, wherein the intermediate member is positioned in the axial direction by the driven member. With this lockup device, the axial positioning of the intermediate member is stable because the intermediate member is positioned by the driven member in the axial direction.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
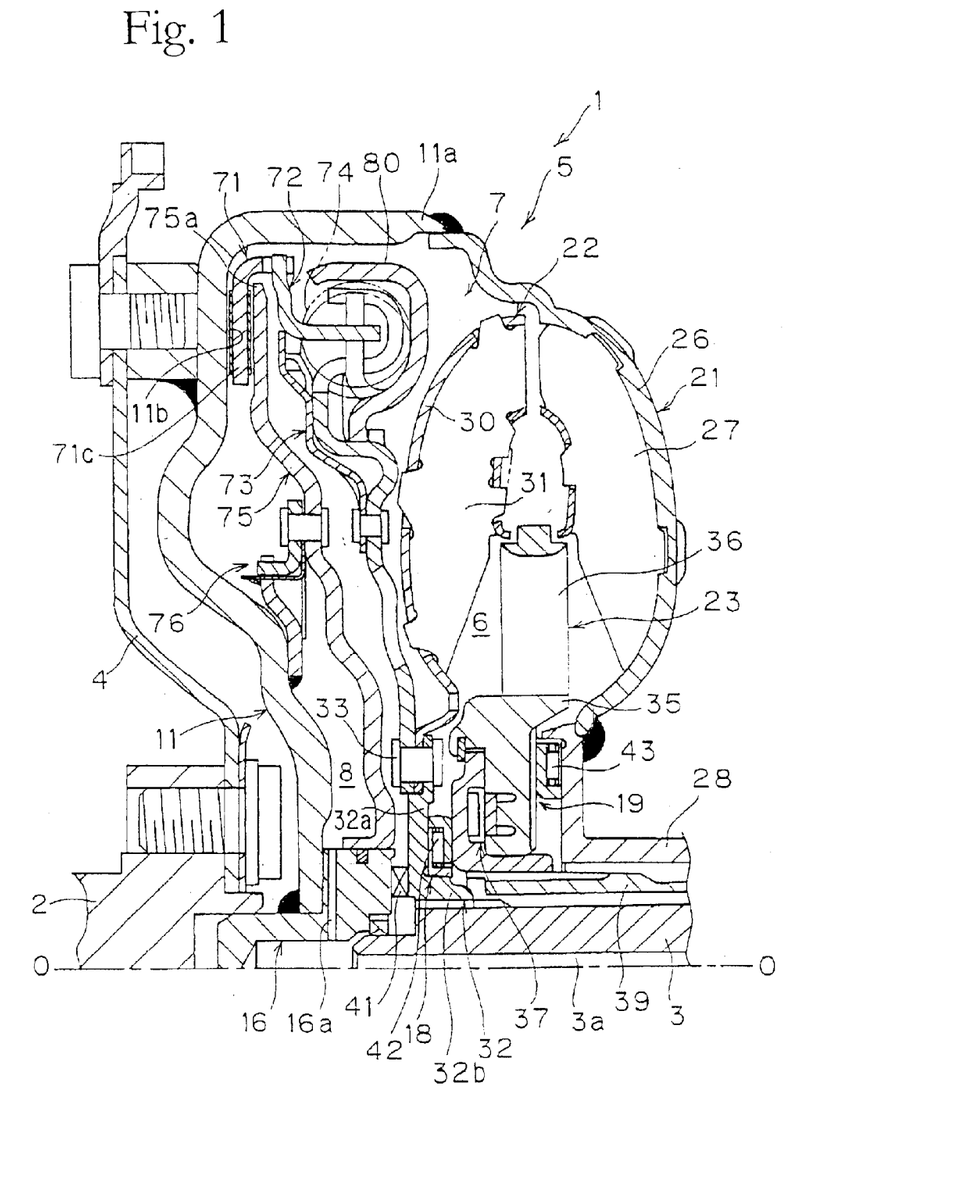
FIG. 1 is a vertical cross-sectional schematic view of a torque converter equipped with a lockup device in accordance with a preferred embodiment of the present invention.

Referring initially to FIG. 1, a torque converter 1 having a lockup device 7 is illustrated in accordance with a first embodiment of the present invention. The embodiment of the present invention is described below based on the drawings.

(1) Basic Structure of Torque Converter

FIG. 1 shows a vertical cross-sectional schematic view of the torque converter 1 in accordance with a preferred embodiment of the present invention. The torque converter 1 serves to transmit torque from a crankshaft 2 of an engine to an input shaft 3 of a transmission. The engine, which is not shown in the figures, is arranged on the left side of FIG. 1 and the transmission, which is also not shown, is arranged on the right side of FIG. 1. The line O—O shown in FIG. 1 is the rotational axis of the torque converter 1.

The torque converter 1 chiefly has a flexible plate 4 and a torque converter main body 5. The flexible plate 4 is made of a relatively thin, circular disc-shaped member and serves both to transmit torque and to absorb bending vibrations transmitted to the torque converter main body 5 from the crankshaft 2. Therefore, the flexible plate 4 is provided with sufficient rigidity in the rotational direction for transmitting torque but its rigidity is relatively low in the bending or axial direction.

The torque converter main body 5 is equipped with a front cover 11 to which an outer circumferential part of the flexible plate 4 is fixed. The torque converter main body 5 also has three types of bladed wheels (an impeller 21, a turbine 22, and a stator 23) and the lockup device 7. A fluid chamber defined by the front cover 11 and the impeller 21 is filled with a fluid and divided into a fluid operating chamber 6 and an annular space 8. The fluid operating chamber 6 is torus shaped and defined by the impeller 21, the turbine 22, and the stator 23. The lockup device 7 is disposed in the annular space 8.

The front cover 11 is a circular disc-shaped body having a roughly cylindrical center boss 16 that extends in the axial direction. The center boss 16 is fixed to an inside circumferential part of the front cover 11 by welding or the like. The center boss 16 is inserted into a center hole of the crankshaft 2.

An outer cylindrical part 11a that extends axially toward the transmission is formed on an outer circumferential part of the front cover 11. The outer circumferential rim of an impeller shell 26 of the impeller 21 is fixed to the tip of the outer cylindrical part 11a by welding or the like. The front cover 11 and the impeller 21 form a fluid chamber the inside of which is filled with fluid. The impeller 21 chiefly has the impeller shell 26, a plurality of impeller blades 27, and an impeller hub 28. The impeller blades 27 are fixed to the inside of the impeller shell 26. The impeller hub 28 is fixed by welding or the like to an inner circumferential part of the impeller shell 26.

The turbine 22 is arranged inside the fluid chamber so as to face the impeller 21 in the axial direction. The turbine 22 chiefly has a turbine shell 30, a plurality of turbine blades 31, and a turbine hub 32. The turbine blades 31 are fixed to the surface of the turbine shell 30 that axially faces the impeller 21. The turbine hub 32 is fixed to the inner circumferential rim of the turbine shell 30. The turbine hub 32 includes a flange part 32a and a boss part 32b. The turbine shell 30 and the turbine hub 32, as well as a driven plate 73 (discussed later), are preferably fixed together with a plurality of rivets 33 at the flange part 32a of the turbine hub 32. Splines that mate with the input shaft 3 are formed on the internal surface of the boss part 32b of the turbine hub 32. Thus, the turbine hub 32 is made to rotate integrally with the input shaft 3.

The stator 23 is installed axially between an inner circumferential part of the impeller 21 and an inner circumferential part of the turbine 22. The stator 23 serves to redirect the flow of the fluid returning to the impeller 21 from the turbine 22. The stator 23 is preferably made of resin or aluminum alloy that has been cast as a single unit. The stator 23 chiefly has a ring-shaped stator carrier 35 and a plurality of stator blades 36 provided on the outer circumferential surface of the stator carrier 35. The stator carrier 35 is supported by a cylindrical stationary shaft 39 with a one-way clutch 37 disposed therebetween. The stationary shaft 39 extends axially toward the transmission between the outer circumferential surface of the input shaft 3 and the inner circumferential surface of the impeller hub 28.

A fluid passage 16a through which fluid can pass in the radial direction is formed in the center boss 16. The fluid passage 16a provides communication between the space on the inside of the center boss 16 that communicates with a center hole 3a of the input shaft 3 and the space 8 on the outside of the center boss 16. A first thrust bearing 41 is disposed axially between the center boss 16 and the turbine hub 32 and bears a thrusting force that is produced due to the rotation of the turbine 22. A second thrust bearing 42 is disposed between the turbine hub 32 and an inner circumferential part of the stator 23 (more specifically, the one-way clutch 37). In the section where the second thrust bearing 42 is provided, a first port 18 is formed which allows fluid to communicate in the radial direction between both sides thereof. In short, the first port 18 links the fluid operating chamber 6 with the fluid passage between the input shaft 3 and the stationary shaft 39. There is also a third thrust bearing 43 disposed axially between the stator 23 (more specifically, the stator carrier 35) and the impeller 21 (more specifically, the impeller hub 28). In the section where the third thrust bearing 43 is provided, a second port 19 is formed which allows fluid to communicate in the radial direction between both sides thereof. In short, the second port 19 links the fluid operating chamber 6 with the fluid passage between the stationary shaft 39 and the impeller hub 28. Also, each fluid passage is connected to a hydraulic circuit, which is not shown in the figures, and fluid can be supplied and discharged to and from each of the fluid passage 16a and ports 18 and 19 independently.

(2) Structure of Lockup Device

Figure 2:
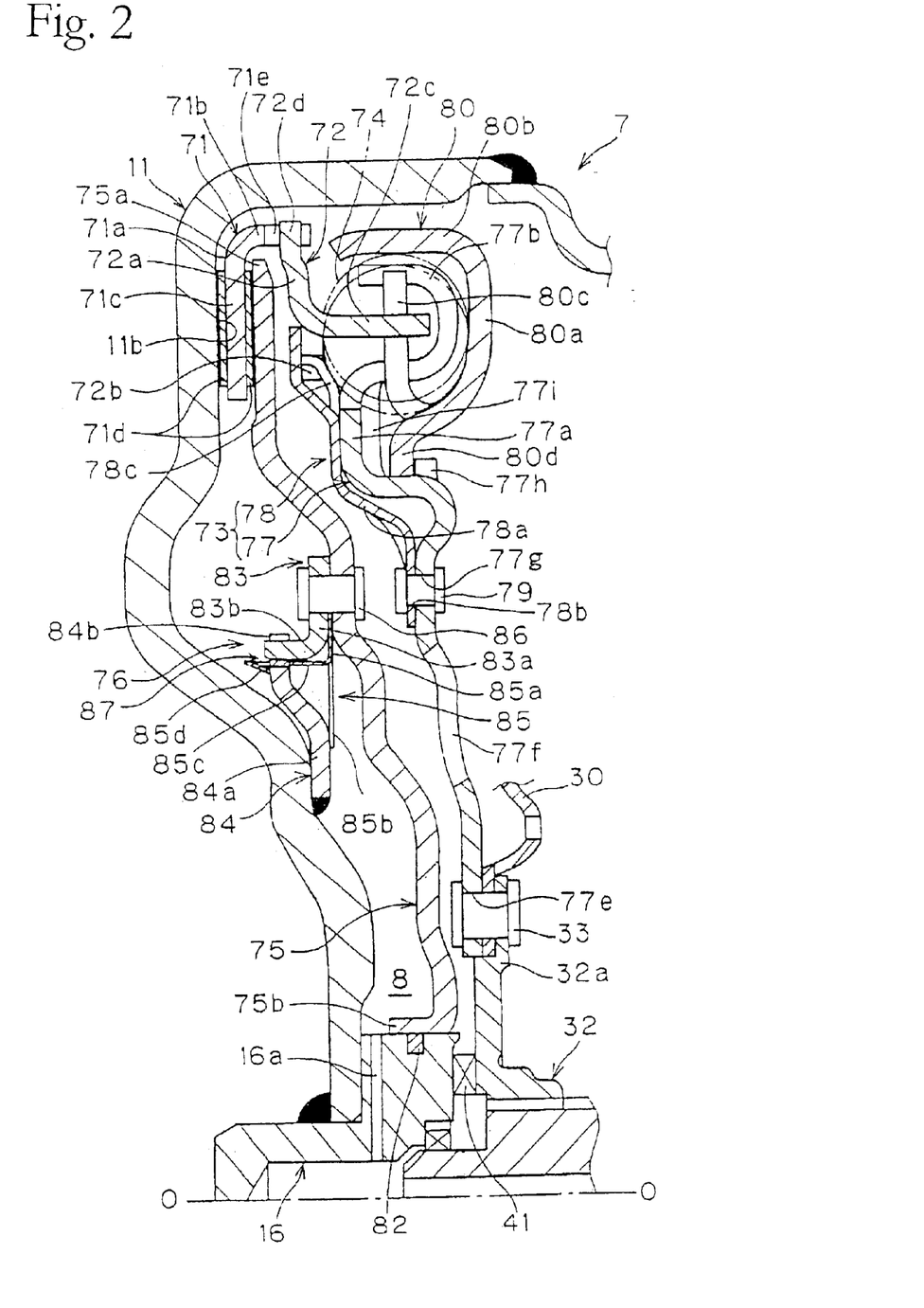
FIG. 2 is an enlarged partial view of FIG. 1 showing a cross-sectional view of the lockup device.
Figure 3:
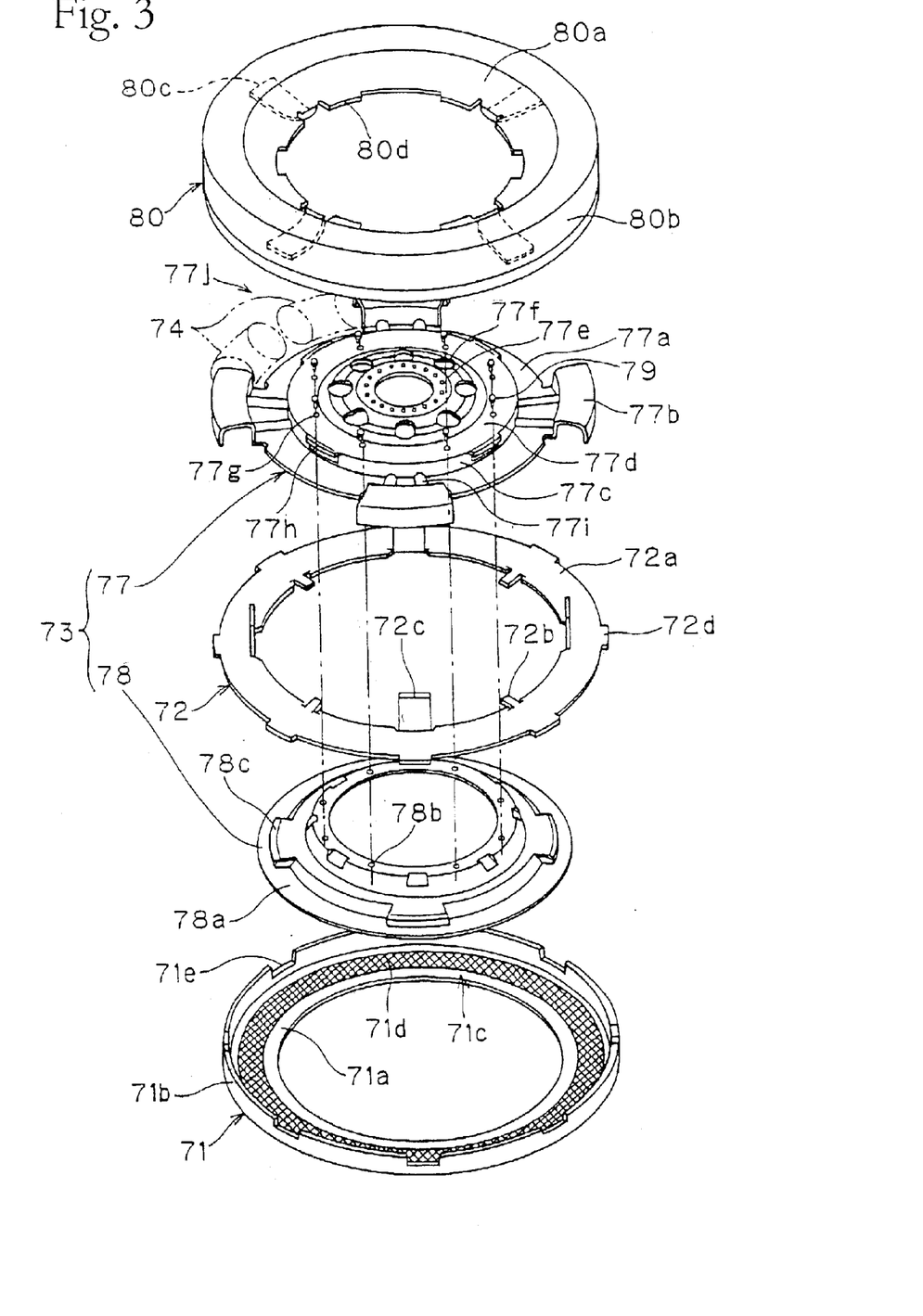
FIG. 3 is an exploded perspective view of components of the lockup device such as a clutch plate, a drive plate, a driven plate, and a spring holder.
Figure 4:
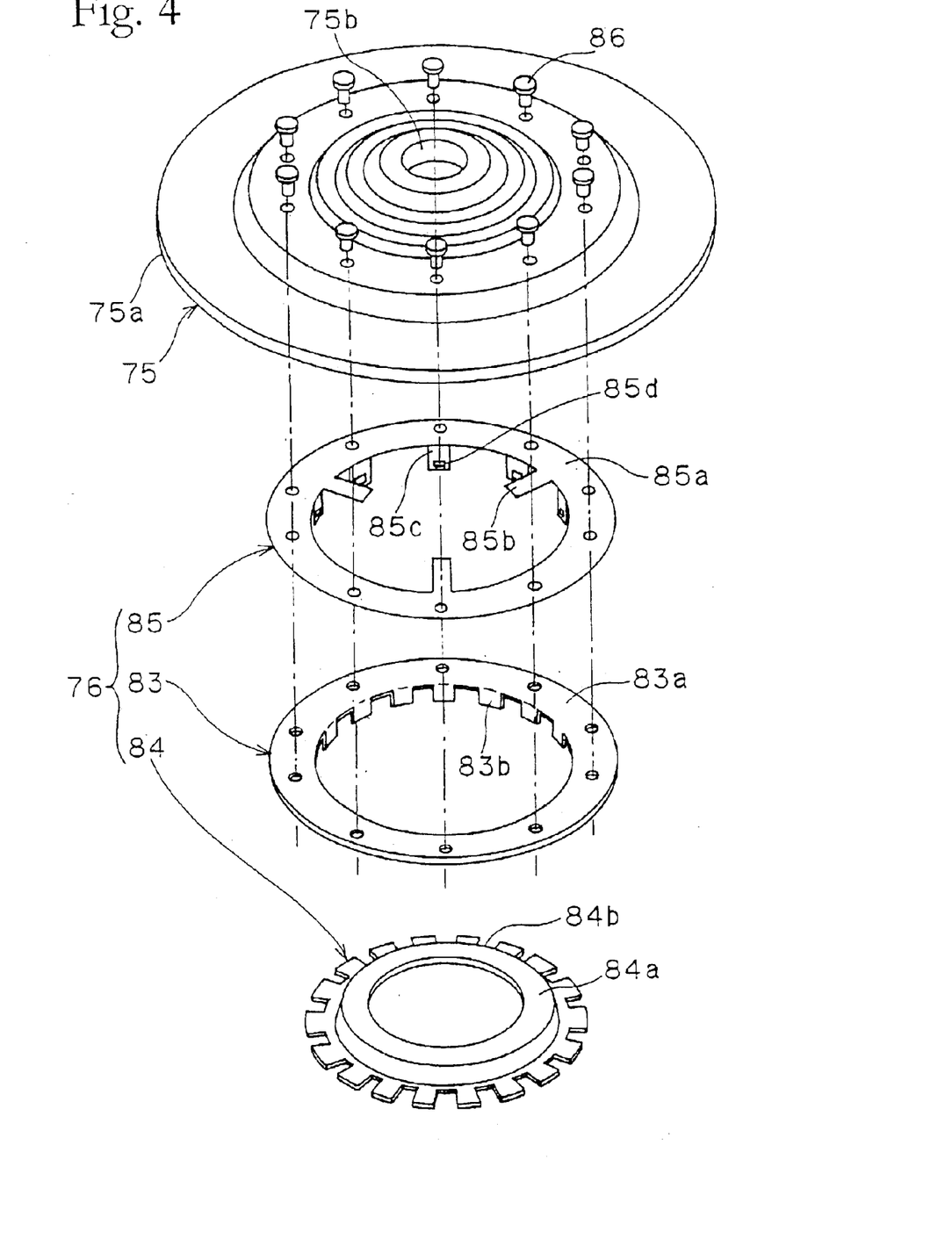
FIG. 4 is an exploded perspective view of a piston and a piston coupling mechanism of the torque converter.

The lockup device 7 is arranged in the space 8 between the turbine 22 and the front cover 11 and serves to couple mechanically the turbine 22 and the front cover 11 together when necessary. The lockup device 7 has both a clutch function and an elastic coupling function. The lockup device 7 chiefly has a clutch plate 71 (clutch member), a drive plate 72 (drive member), the driven plate 73 (driven member), a plurality of torsion springs 74 (elastic member), a spring holder 80 (intermediate member), a piston 75, and a piston coupling mechanism 76. FIG. 2 is a cross-sectional view of the portion of the torque converter 1 that contains the lockup device 7. FIG. 3 is an exploded perspective view of the clutch plate 71, the drive plate 72, the driven plate 73, the plurality of torsion springs 74, and the spring holder 80 of the lockup device 7. FIG. 4 is an exploded perspective view of the piston 75 and the piston coupling mechanism 76.

Driven Plate

Referring to FIGS. 2 and 3, the driven plate 73 has a first driven plate 77 and a second driven plate 78. The first driven plate 77 is an annular plate member whose inner circumferential part is fixed along with the turbine shell 30 to the flange part 32a of the turbine hub 32 with the plurality of rivets 33. The first driven plate 77 has an annular part 77a, a plurality of claw parts 77b, a cylindrical part 77c, and an annular part 77d. The claw parts 77b are formed on the outside edge of the annular part 77a. The cylindrical part 77c extends axially toward the transmission from the inside edge of the annular part 77a. The annular part 77d is formed on the end of the cylindrical part 77c that is closer to the transmission. The annular part 77d has a plurality of holes 77e, a plurality of fluid holes 77f, and a plurality of holes 77g. The plurality of holes 77e is formed in an inner circumferential part of the annular part 77d. The plurality of fluid holes 77f is formed to the radial outside of the holes 77e. The plurality of holes 77g is formed to the radial outside of the fluid holes 77f. The holes 77e are provided for rivets 33 to pass through. The fluid holes 77f serve to secure the flow of fluid in both axial directions through the first driven plate 77. The holes 77g are used for fixing the second driven plate 78 with a plurality of rivets 79 to the first driven plate 77. The cylindrical part 77c has a plurality of cut-and-raised parts 77h formed near the edge of the transmission side thereof so as to point radially outward. In this embodiment, there are preferably four cut-and-raised parts 77h arranged with equal spacing in the rotational direction. The annular part 77a has a plurality of protrusions 77i that protrude toward the transmission side of the annular part 77a in the axial direction and extend in a radial manner, preferably from the cylindrical part 77c to the claw parts 77b. The protrusions 77i are formed in pairs in positions corresponding to the circumferential spaces between the cut-and-raised parts 77h. Similarly to the protrusions 77i, the claw parts 77b are also formed in positions corresponding to the circumferential spaces between the cut-and-raised parts 77h. Thus, in this embodiment, there are preferably four claw parts 77b arranged with equal spacing in the rotational direction. The claw parts 77b have a C-shaped cross section that protrudes toward the transmission in the axial direction. The circumferential spaces between the claw parts 77b constitute spring housing sections 77j, of which, similar to the claw parts 77b, there are preferably four in this embodiment. There are preferably two torsion springs 74 arranged inside each spring housing section 77j. Thus, there are preferably a total of four pairs of torsion springs 74 (eight springs) arranged in the rotational direction.

The second driven plate 78 is an annular plate member arranged on the side of the first driven plate 77 that faces the engine in the axial direction. An inner circumferential part thereof is fixed to the first driven plate 77 with the plurality of rivets 79. The second driven plate 78 has an annular part 78a, a plurality of holes 78b formed in an inner circumferential part of the annular part 78a, and a plurality of cut-and-raised parts 78c formed on an outer circumferential portion. The holes 78b are formed in positions corresponding to the holes 77g of the first driven plate 77 and the rivets 79 are passed therethrough. The cut-and-raised parts 78c are formed so as to bulge out toward the transmission from positions corresponding to the claw parts 77b of the first driven plate 77. In this embodiment, there are preferably four of these cut-and-raised parts 78c.

Drive Plate

The drive plate 72 is a member that can rotate relative to the driven plate 73 and is sandwiched axially between the first driven plate 77 and the second driven plate 78. The drive plate 72 is an annular plate member having an annular part 72a, a plurality of protrusions 72b, a plurality of claw parts 72c, and a plurality of protrusions 72d. The protrusions 72b are formed on the inside edge of the annular part 72a and extend radially inward therefrom. The claw parts 72c (abutting parts) are formed in positions corresponding to the circumferential spaces between the protrusions 72b and extend axially from the annular part 72a toward the transmission. The plurality of protrusions 72d (mating parts) is formed on the outside edge of the annular part 72a and extends radially outward therefrom.

The claw parts 72c extend toward the transmission in the axial direction and are formed in positions corresponding to the claw parts 77b of the first driven plate 77. There are preferably four claw parts 72c in this embodiment and they are arranged in the C-shaped portions of the claw parts 77b of the first driven plate 77. The circumferential width of the claw parts 72c is narrower than the circumferential width of the cut-and-raised parts 78c of the second driven plate 78. The inner circumferential edge parts of the claw parts 72c are formed so as not to interfere with the outer circumferential face of the cut-and-raised parts 78c.

The protrusions 72b are formed circumferentially between the claw parts 72c and project radially inward. There are preferably four protrusions 72b in this embodiment and they extend further inward in the radial direction than the rotationally facing edge sections of the cut-and-raised parts 78c of the second driven plate 78. Thus, when the drive plate 72 rotates relative to the driven plate 73, the protrusions 72b touch against the rotationally facing edge sections of the cut-and-raised parts 78c such that the relative rotation between the drive plate 72 and the driven plate 73 is limited to a prescribed angular range. The inside edge of the drive plate 72 (i.e., the inside edge portion located circumferentially between the protrusions 72b and the claw parts 72c) fits around the outside edge of the cut-and-raised parts 78d of the second driven plate 78. In short, the drive plate 72 is positioned in the radial direction by the driven plate 73 (more specifically, the second driven plate 78). The engine-side surface of the drive plate 72 touches against the transmission-side surface of the outer circumferential part of the second driven plate 78. As a result, the drive plate 72 is also positioned in the axial direction by the driven plate 73. The protrusions 72d are formed so as to project radially outward from positions corresponding to the claw parts 72c and the protrusions 72b.

Spring Holder

The spring holder 80 is a member that can rotate relative to the drive plate 72 and the driven plate 73 and is disposed on the side of the first driven plate 77 that faces the transmission in the axial direction. The spring holder 80 is an annular plate member having an annular part 80a, a cylindrical part 80b, a plurality of claw parts 80c, and a plurality of protrusions 80d. The cylindrical part 80b is formed on the outside edge of the annular part 80a and extends in the axial direction toward the engine. The plurality of claw parts 80c (transmitting parts) is formed on the inside edge of the annular part 80a. The plurality of protrusions 80d is arranged circumferentially on both sides of each claw part 80c. The end of the cylindrical part 80b that is closer to the engine has a narrowed form.

The claw parts 80c are formed by bending back the inside edge of the annular part 80a toward the outside. In other words, the claw parts 80c are formed by bending in the direction of the engine protrusions that extend axially inward from the annular part 80a such that the ends of the claw parts 80c opposite the annular part 80a extend toward the cylindrical part 80b. The claw parts 80c are arranged in positions corresponding to the circumferential center portions of the spring housing sections 77j of the first driven plate 77. The circumferential width of the inside portion of the claw parts 80c is smaller than circumferential width of the cut-and-raised parts 77h of the first driven plate 77.

The protrusions 80d are arranged circumferentially on both sides of each claw part 80c and protrude radially inward from the annular part 80a. The width of the portions circumferentially between the protrusions 80d (i.e., the width of the portions circumferentially between the protrusions 80d where the claw parts 80c are not formed) is larger than the circumferential width of the cut-and-raised parts 77h of the first driven plate 77. The plurality of protrusions 80d is arranged so as to be sandwiched axially between the cut-and-raised parts 77h and the protrusions 77i of the first driven plate 77. More specifically, the surface of each protrusion 80d that faces the transmission in the axial direction is supported by a cut-and-raised part 77h of the first driven plate 77 and the surface of the annular part 80a that faces the engine is supported by the protrusions 77i of the first driven plate 77. As a result, the spring holder 80 is positioned in the axial direction by the driven plate 73 (more particularly, the first driven plate 77). Also, the inside edges of the protrusions 80d fit around the outside surface of the cylindrical part 77c of the first driven plate 77. In short, the driven plate 73 (more particularly, the first driven plate 77) supports the radially inside portion of the spring holder 80 such that the spring holder 80 can rotate relative thereto and also positions the spring holder 80 in both the axial and radial directions.

Torsion Springs

The torsion springs 74 have a plurality (preferably eight in this embodiment) of coil springs arranged in pairs in the spring housing sections 77j of the first driven plate 77. The rotationally facing ends of each pair of the torsion springs 74 are supported, either directly or through a spring seat, on the rotationally facing edge sections of the claw parts 77b, which serve to transmit torque. The claw parts 80c of the spring holder 80 are arranged so as to be sandwiched circumferentially between the two torsion springs 74 disposed in each spring housing section 77j. The claw parts 80c serve to support either directly or through a spring seat the mutually facing ends of the two torsion springs 74, i.e., the ends between which the claw parts 80c are sandwiched. Moreover, the radially outside portion and the transmission facing portion of the torsion springs 74 are supported by the annular part 80a and the cylindrical part 80b of the spring holder 80.

Thus, when the drive plate 72 and the driven plate 73 rotate relative to each other, the pairs of the torsion springs 74 are compressed between the rotationally facing edge sections of the claw parts 72c of the drive plate 72 and the rotationally facing edge sections of the claw parts 77b of the driven plate 73. When this occurs, the claw parts 80c of the spring holder 80 act to press against the adjacent rotationally facing ends of the torsion springs 74 due to the compression of the torsion springs 74. In short, the pairs of the torsion springs 74 housed in the spring housing sections 77j are made to act in series in the rotational direction.

Clutch Plate

The clutch plate 71 functions chiefly as a friction coupling part that couples with and releases from the front cover 11. It is installed axially between the driven plate 73 and the front cover 11. The clutch plate 71 is an annular plate member having an annular part 71a and a cylindrical part 71b that extends from the outside edge of the annular part 71a toward the turbine 22 in the axial direction. The inner circumferential portion of the annular part 71a constitutes the friction coupling part 71c and is in close proximity to the friction surface 11b of the front cover 11. Friction facings 71d are attached to both axial surfaces of the friction coupling part 71c. The cylindrical part 71b has a plurality (preferably eight in this embodiment) of recessions 71e formed in the transmission-facing edge thereof so as to correspond to the protrusions 72d of the drive plate 72. The protrusions 72d mate with the recessions 71e such that relative rotation is not possible. In short, the clutch plate 71 mates with the drive plate 72 such that it cannot rotate relative to the drive plate 72.

Piston

Referring now to FIGS. 2 and 4, the piston 75 is a circular disc-shaped member with a center hole formed therein and serves to engage and disengage the clutch. The piston 75 is positioned on the radial outside of the center boss 16. The outer circumferential portion of the piston 75 constitutes a pressing part 75a. The pressing part 75a is a flat, annular section disposed on the transmission side of the friction coupling part 71c of the clutch plate 71. Consequently, when the piston 75 moves toward the engine, the pressing part 75a presses the friction coupling part 71c against the friction surface 11b of the front cover 11. Meanwhile, the inner circumferential portion of the piston 75 is provided with a cylindrical part 75b that extends toward the engine in the axial direction. The internal surface of the cylindrical part 75b fits around the external surface of the center boss 16 such that it can move in the axial direction. A seal ring 82 is provided between the external surface of the center boss 16 and the cylindrical part 75b so that fluid does not flow between the engine side of the piston 75 and the transmission side of the piston 75 within the space 8.

Next, the relative positioning of the clutch plate 71, the drive plate 72, the torsion springs 74, and the piston 75 is explained. The clutch plate 71 has the friction coupling part 71c and is positioned in the radial direction such that it is aligned with the friction surface 11b of the front cover 11. The pressing part 75a of the piston 75 extends to the radial position of the friction coupling part 71c so that it can press against the friction coupling part 71c. The mounting radius of the torsion springs 74 is shorter than a radius extending to outside edge of the piston 75 or the friction coupling part 71c. The claw parts 72c of the drive plate 72 are arranged at a radial position that is roughly the same as the mounting radius of the torsion springs 74. The protrusions 72d of the drive plate 72 are arranged at a radial position that is farther from the rotational axis than the mounting radius of the torsion springs 74 (in this embodiment, farther from the rotational axis than outside edges of the piston 75 and the friction coupling part 71c) and mate with the recessions 71e of the clutch plate 71.

Piston Coupling Mechanism

The piston coupling mechanism 76 functions to couple the piston 75 to the front cover 11 in such a manner that the piston rotates integrally with the front cover 11 but can move relative to the front cover 11 in the axial direction. With respect to the radial direction, the piston coupling mechanism 76 is provided at an intermediate position between the pressing part 75a and the cylindrical part 75b of the piston 75. The piston coupling mechanism 76 has a piston lug plate 83, a cover lug plate 84, and a return plate 85.

The piston lug plate 83 is an annular plate that is fixed to the engine side of the piston 75 with a plurality of rivets 86. The piston lug plate 83 has an annular part 83a and a plurality of claw parts 83b that project toward the engine in the axial direction from the inside edge of the annular part 83a. The claw parts 83b are arranged circumferentially and there are preferably eighteen of them in this embodiment. The cover lug plate 84 is an annular plate that is fixed to the turbine side of the front cover 11 by welding. The cover lug plate 84 has an annular part 84a and a plurality of recessions 84b formed so as to recess inward from the outside edge of the annular part 84a.

The recessions 84b are arranged in positions corresponding to the claw parts 83b of the piston lug plate 83 and the claw parts 83b mate therewith such that the two lug plates 83 and 84 cannot rotate relative to each other but can move in the axial direction relative to each other. Thus, the piston 75 can move relative to the front cover 11 in the axial direction but not in the rotational direction. When the recessions 84b and the claw parts 83b are in the mated state, a plurality (preferably eighteen in this embodiment) of slit parts 87, i.e., slit-shaped gaps, are formed radially-between the claw parts 83b and the recessions 84b.

The return plate 85 is an annular plate that is fixed along with the piston lug plate 83 to the engine side of the piston 75 with rivets 86. The return plate 85 has an annular part 85a, a plurality of protrusions 85b, and a plurality of claw parts 85c. The protrusions 85b project radially inward from the inside edge of the annular part 85a. The plurality of claw parts 85c are formed circumferentially between the protrusions 85b. There are three protrusions 85b in this embodiment and the tips of these protrusions 85b touch against the transmission facing surface of the annular part 84a of the cover lug plate 84. There are preferably nine claw parts 85c in this embodiment and these claw parts 85c are shaped such that they extend toward the engine in the axial direction from the inside edge of the annular part 85a. The tips of the claw parts 85c (i.e., the portion closer to the engine) are provided with cut-and-raised parts 85d that catch in slit parts 87 and serve to limit the distance to which the piston 75 can move toward the transmission in the axial direction.

Thus, when the piston 75 moves toward the engine in the axial direction, the return plate 85 can apply a force that pushes the piston 75 toward the transmission in the axial direction because protrusions 85b deform elastically. Moreover, when the piston 75 moves toward the transmission in the axial direction, the return plate 85 can limit the movement of the piston 75 toward the transmission because cut-and-raised parts 85d of claw parts 85c touch against the inner circumferential rim of the recessions 84b of the cover lug plate 84 (more particularly, against slit parts 87).

(3) Operation of Torque Converter

The operation of the torque converter is described with reference primarily to FIGS. 1 and 2.

Immediately after the engine is started, fluid is supplied to the inside of the torque converter main body 5 through the fluid passage 16a and the second port 19 and fluid is discharged from the first port 18. The fluid supplied through the fluid passage 16a flows radially outward between the front cover 11 and the piston 75 within the space 8.

The fluid passes through the axial spaces on both sides of the clutch plate 71 and finally flows into the fluid operating chamber 6.

During this process, the piston 75 moves toward the turbine 22 because the hydraulic pressure is higher in the space 8 than in the fluid operating chamber 6 and because of the force applied by protrusions 85b of the return plate 85. The piston 75 stops when cut-and-raised parts 85d of the return plate 85 of the piston coupling mechanism 76 abut against the rim part of the slit parts 87. When the lockup device 7 is disengaged in this manner, torque is transmitted between the front cover 11 and the turbine 22 by the fluid drive between the impeller 21 and the turbine 22.

Under these conditions, there are times when changes in the hydraulic pressure within the torque converter 1 cause a force to act on the piston 75 such that it moves toward the front cover 11. However, since the return plate 85 pushes the piston in the direction of separation from the front cover 11, it is difficult for the piston 75 to move toward the engine.

When the gear ratio of the torque converter 1 increases and the rotational speed of the input shaft 3 reaches a prescribed speed, fluid from the space 8 is discharged through the fluid passage 16a. As a result, the hydraulic pressure of the fluid operating chamber 6 becomes higher than the hydraulic pressure of the space 8 and the piston 75 moves toward the engine. As a result, the pressing part 75a of the piston 75 presses the friction coupling part 71c of the clutch plate 71 against friction surface 11b of the front cover 11. Since the piston 75 rotates integrally with the front cover 11 due to the piston coupling mechanism 76, torque is transferred from the front cover 11 to the clutch plate 71. Meanwhile, since the piston lug plate 83 of the piston coupling mechanism 76 is close to the cover lug plate 84 because the piston 75 has moved toward the engine, the protrusions 85b of the return plate 85 touch against the transmission facing surface of the annular part 84a of the cover lug plate 84 and deform elastically. The torque of the front cover 11 is transmitted from the drive plate 72 (which is mated with the clutch plate 71 such that it cannot rotate relative to the clutch plate) to the driven plate 73 through the torsion springs 74. In short, torque is transmitted from the drive plate 72 to the driven plate 73 through the torsion springs 74. In other words, the front cover 11 is mechanically coupled with the turbine 22 and the torque of the front cover 11 is imparted directly to the input shaft 3 through the turbine 22. When this occurs, the relative rotation between the drive plate 72 and the driven plate 73 causes the torsion springs 74 to be compressed between the rotationally facing edge surfaces of the claw parts 72c of the drive plate 72 and the rotationally facing edge surfaces of the claw parts 77b of the first driven plate 77 while the claw parts 80c of the spring holder 80 are sandwiched between spring pairs. In other words, the spring holder 80 rotates relative to the drive plate 72 and the driven plate 73 and functions to cause the pairs of the torsion springs 74 to act in series in the rotational direction. The side of the torsion springs 74 that faces radially outward and the side of the same that faces toward the transmission are supported by the spring holder 80 and cannot easily slide with respect to the drive plate 72 and the driven plate 73. The rotation of the drive plate 72 with respect to the driven plate 73 is limited to a prescribed angular range because the protrusions 72b (which are provided on the inner circumference of the drive plate 72) touch against the rotationally facing edge sections of the cut-and-raised parts 78c (which are provided on the second driven plate 78). Since both surfaces of the friction coupling part 71c of the clutch plate 71 are provided with friction facings 71d, the torque transmission capacity is larger than for lockup devices having a single friction surface.

(4) Features of Lockup Device

This embodiment of the lockup device 7 has the following features.

Friction Coupling Part Arranged on Outside with Respect to Radial Direction

In this embodiment of the lockup device 7, the clutch plate 71 has the friction coupling part 71c and the drive plate 72 has the claw parts 72c that abut against the rotationally facing ends of the torsion springs 74 in such a manner that torque can be transmitted. Further, the protrusions 72d are positioned farther to the outside in the radial direction than the claw parts 72c and mate with the recessions 71e of the clutch plate 71 in such a manner that the drive plate 72 cannot rotate relative to the clutch plate 71. Consequently, the protrusions 72d of the drive plate 72 can be arranged on the outside with respect to the radial direction. As a result, the friction coupling part 71c of the clutch plate 71 can be arranged on the outside with respect to the radial direction and the torque transmission capacity of the lockup device 7 can be increased. Furthermore, the assembly of the lockup device is simple because the drive plate 72 can be assembled to the clutch plate 71 by simply mating the protrusions 72d of the drive plate 72 with the recessions 71e of the clutch plate 71.

Drive Plate Supported by Driven Plate

In this embodiment of the lockup device 7, the drive plate 72 mates with the driven plate 73 (more specifically, with the cut-and-raised parts 78c of the second driven plate 78) in such a manner that it can rotate relative to the driven plate 73 and is positioned in the axial and radial directions by the driven plate 73. Consequently, the axial and radial positions of the drive plate 72 are stable. As a result, the axial and radial positions of the clutch plate 71, which mates with the drive plate 72 in such a manner that it cannot rotate relative thereto, are also stable.

Limited Relative Rotation Angle Between Drive Plate and Driven Plate

In this embodiment of the lockup device 7, the protrusions 72d of the drive plate 72 touch against the rotationally facing end parts of the cut-and-raised parts 78c of the second driven plate 78 and prohibit relative rotation between the drive plate 72 and the driven plate 73 when the relative rotation between the two plates 72 and 73 reaches a prescribed angle. In short, the cut-and-raised parts 78c of the second driven plate 78 function as stoppers with respect to the protrusions 72d of the drive plate 72. Thus, the cut-and-raised parts 78c of the second driven plate 78 function both to position the drive plate 72 in the axial and radial directions and as stoppers for stopping the drive plate 72. As a result, since the compression of the torsion springs 74 can be limited to a prescribed angular range, any desired torsional characteristic can be obtained and increases in the number of parts can be suppressed.

Sliding of Torsion Springs Against other Parts an be Reduced

In this embodiment of the lockup device 7, the transmission-facing side and radially outward facing side of each torsion spring 74 is supported by the spring holder 80. As a result, it is difficult for the torsion springs 74 to slide against the drive plate 72 and the driven plate 73. Also, since the torsion springs 74 have a plurality of pairs (preferably four in this embodiment) of coil springs arranged so as to act in series in the rotational direction, torsional vibration absorbing performance can be achieved which is similar to that obtained with torsion springs that are long in the rotational direction.

Spring Holder Supported by Drive Plate

In this embodiment of the lockup device 7, the spring holder 80 mates with the first driven plate 77 in such a manner that it can rotate relative to the first driven plate 77 and the inner circumferential portion of the spring holder 80 is positioned in the radial and axial directions by the cylindrical part 77c, the cut-and-raised parts 77h, and the protrusions 77i of the first driven plate 77. As a result, the radial and axial positions of the spring holder 80 are stable. Furthermore, since only the inner circumferential portion of the spring holder 80 touches against the first driven plate 77, there are few sections where sliding occurs. Thus, wear between the spring holder 80 and the first driven plate 77 can be reduced. Wear between the spring holder 80 and the drive plate 72 can also be reduced because the lockup device is structured in such a manner that the spring holder 80 does not slide against the drive plate 72.

Other Embodiments

An embodiment of the present invention has been described based on the drawings, but the specific features of the present invention are not limited to those of the previously described embodiment. Modifications are possible so long as the gist of the invention is not exceeded.

For example, instead of applying the lockup device of the present invention to a torque converter, it can be applied to a fluid coupling or other fluid-type torque transmission device.

EFFECTS OF THE INVENTION

With the lockup device of the present invention, the friction coupling part can be arranged on the outside with respect to the radial direction. Furthermore, sliding of the torsion springs against other members can be reduced.

As used herein, the following directional terms "forward, rearward, above, downward, vertical, horizontal, below, and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-073007. The entire disclosure of Japanese Patent Application No. 2002-073007 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A lockup device in a fluid-type torque transmission device comprising:
   a clutch member being an annular plate and having a friction coupling part being configured to be pressed against a friction surface of a front cover of the fluid-type torque transmission device;
   a piston being arranged between said front cover and a turbine of the fluid-type torque transmission device, said piston being configured to press said friction coupling part against said friction surface;
   a plurality of elastic members being arranged in a rotational direction, an outside radius of said clutch member being larger than a mounting radius of said elastic members;

a drive member having an abutting part being configured to abut against rotationally-facing ends of said elastic members to transmit torque, and a plurality of mating parts being positioned farther outward in a radial direction than said abutting part, said plurality of mating parts extending radially outward and being configured to mate with said clutch member to prevent relative rotation between said drive member and said clutch member, said drive member having an annular part, said abutting part being formed on an inner circumferential section of said annular part, said abutting part being configured to extend in an axial direction; and a driven member being fixed to said turbine, said driven member being configured to receive torque from said elastic members.

2. The lockup device according to claim 1, wherein said drive member is positioned in said axial direction and a radial direction by said driven member.

3. The lockup device according to claim 2, wherein said driven member has a first driven member that is fixed to said turbine and a second driven member that is fixed to said first driven member, said driven member serves to position said drive member in said axial and radial directions.

4. The lockup device according to claim 3, wherein said driven member limits rotation of said drive member to a prescribed angular range when said drive member rotates relative to said driven member.

5. A lockup device in a fluid-type torque transmission device comprising:

a clutch member having a friction coupling part being configured to be pressed against a friction surface of a front cover of the fluid-type torque transmission device;

a plurality of elastic members being arranged in a rotational direction;

a drive member being configured to mate with said clutch member to prevent relative rotation between said drive member and said clutch member and to transmit torque to said plurality of elastic members, said drive member having an annular part and an abutting part being formed on an inner circumferential section of said annular part, said abutting part being configured to extend in an axial direction;

a driven member being fixed to a turbine and to receive torque from said plurality of elastic members;

an intermediate member being configured to support at least the radially outward facing side and one axially facing side of each of the elastic members, said intermediate member being rotatable relative to said driven member and said drive member; and a piston being arranged between said front cover and said turbine, said piston being configured to press said friction coupling part against said friction surface.

6. The lockup device according to claim 5, wherein said intermediate member is positioned in a radial direction by said driven member.

7. The lockup device according to claim 6, wherein said intermediate member is positioned in an axial direction by said driven member.

8. The lockup device according to claim 5, wherein said intermediate member is positioned in an axial direction by said driven member.

9. A lockup device comprising:

a clutch member having a friction coupling part being configured to be pressed against a friction surface of a front cover of the fluid-type torque transmission device;

a plurality of elastic members being arranged in a rotational direction;

a drive member being configured to mate with said clutch member to prevent relative rotation between said drive member and said clutch member and to transmit torque to said plurality of elastic members, said plurality of elastic members including a plurality of pairs of elastic members arranged to operate in series in a rotational direction;

a driven member being fixed to a turbine and to receive torque from said plurality of elastic members;

an intermediate member being configured to support at least the radially outward facing side and one axially facing side of each of the elastic members, said intermediate member being rotatable relative to said driven member and said drive member, said intermediate member having a transmitting part arranged between each of said pairs of elastic members; and a piston being arranged between said front cover and said turbine, said piston being configured to press said friction coupling part against said friction surface.

10. The lockup device according to claim 9, wherein said intermediate member is positioned in a radial direction by said driven member.

11. The lockup device according to claim 10, wherein said intermediate member is positioned in an axial direction by said driven member.

12. The lockup device according to claim 9, wherein said intermediate member is positioned in an axial direction by said driven member.

* * * * *